(12) United States Patent
Shaharabany et al.

(10) Patent No.: US 9,703,527 B2
(45) Date of Patent: Jul. 11, 2017

(54) STORAGE DEVICE AND METHOD FOR REALLOCATING STORAGE DEVICE RESOURCES BASED ON AN ESTIMATED FILL LEVEL OF A HOST BUFFER

(71) Applicants: Amir Shaharabany, Kochav Yair (IL); Alon Marcu, Tel Mond (IL); Hadas Oshinsky, Kfar Saba (IL)

(72) Inventors: Amir Shaharabany, Kochav Yair (IL); Alon Marcu, Tel Mond (IL); Hadas Oshinsky, Kfar Saba (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 375 days.

(21) Appl. No.: 13/735,767

(22) Filed: Jan. 7, 2013

(65) Prior Publication Data

US 2014/0189263 A1     Jul. 3, 2014

Related U.S. Application Data

(60) Provisional application No. 61/747,442, filed on Dec. 31, 2012.

(51) Int. Cl.
    *G06F 12/00*     (2006.01)
    *G06F 5/14*     (2006.01)
    *G06F 3/06*     (2006.01)

(52) U.S. Cl.
    CPC .............. *G06F 5/14* (2013.01); *G06F 3/0611* (2013.01); *G06F 3/0656* (2013.01); *G06F 3/0679* (2013.01)

(58) Field of Classification Search
    CPC ........ G06F 5/14; G06F 3/0679; G06F 3/0656; G06F 3/0611
(Continued)

(56) References Cited

U.S. PATENT DOCUMENTS 5,414,816 A    5/1995   Oyadomari
5,659,799 A    8/1997   Wu et al.
(Continued)

FOREIGN PATENT DOCUMENTS

CN         1791918 A     6/2006
CN     101101569 A     1/2008
(Continued)

OTHER PUBLICATIONS

International Search Report and Written Opinion for PCT/US2013/071999 dated Feb. 27, 2014, 9 pages.
(Continued)

*Primary Examiner* — Matthew Bradley
(74) *Attorney, Agent, or Firm* — Brinks Gilson & Lione

(57) ABSTRACT

A storage device and method for reallocating storage device resources based on an estimated fill level of a host buffer are disclosed. In one embodiment, a storage device receives, from a host device, a rate at which the host device stores data in its buffer and tracks an amount of data that was received from the host device. The storage device estimates a fill level of the buffer at an elapsed time using the rate, the elapsed time, and the amount of data received from the host device over that elapsed time. If the estimated fill level of the buffer is above a threshold, the storage device increases a rate of receiving data from the host device.

39 Claims, 4 Drawing Sheets

(58) Field of Classification Search
USPC .......................................................... 711/154
See application file for complete search history.

(56) References Cited

U.S. PATENT DOCUMENTS

| | | | |
|---|---|---|---|
| 6,952,664 B1 | 10/2005 | Lahiri et al. | |
| 2002/0159385 A1* | 10/2002 | Susnow | H04L 12/5693 370/229 |
| 2006/0294267 A1 | 12/2006 | Lenaerts | |
| 2009/0022172 A1* | 1/2009 | Haberman | H04N 21/23424 370/429 |
| 2010/0100669 A1 | 4/2010 | Huang | |

FOREIGN PATENT DOCUMENTS

| | | |
|---|---|---|
| CN | 102033945 A | 4/2011 |
| CN | 102770848 A | 11/2012 |

OTHER PUBLICATIONS

"Real-Time Garbage Collection for Flash-Memory Storage Systems of Real-Time Embedded Systems," Chang et al., ACM Transactions on Embedded Computing Systems, vol. V, No. N, Jun. 2004, pp. 1-26.

English language translation of Office Action and Search Report in corresponding Chinese Application Serial No. 21380068461.6, dated Jan. 17, 2017, 16 pages.

* cited by examiner

STORAGE DEVICE AND METHOD FOR REALLOCATING STORAGE DEVICE RESOURCES BASED ON AN ESTIMATED FILL LEVEL OF A HOST BUFFER

CROSS-REFERENCE TO RELATED APPLICATION

This application claims the benefit of U.S. Provisional Application No. 61/747,442, filed Dec. 31, 2012, which is hereby incorporated by reference.

BACKGROUND

Storage devices can be used to store streamed data. The source of the streamed data can be the host device itself (e.g., the host device's video and/or audio sensors when a user is shooting a video) or can be external to the host device (e.g., from a server in network communication with the host device). Because the data is streaming, the storage device should have the capability of receiving and storing the data at the rate at which it is being delivered to the storage device. However, because the storage device may need to divert its resources now and again for memory management and other functions, the host device can use a jitter buffer to temporarily hold the data until the storage device can resume its full accommodation of the incoming data. To ensure that the streamed data will not overflow the buffer, the buffer can be designed to be relatively large, and the channel between the host device and the storage device can be designed so that its rate is significantly faster than the rate that the host device sends the streamed data to the storage device.

OVERVIEW

Embodiments of the present invention are defined by the claims, and nothing in this section should be taken as a limitation on those claims.

By way of introduction, the below embodiments relate to a storage device and method for reallocating storage device resources based on an estimated fill level of a host buffer. In one embodiment, a storage device is in communication with a host device having a buffer for storing data before it is sent to the storage device for storage. The storage device receives, from the host device, a rate at which the host device stores data in the buffer and tracks an amount of data that was received from the host device. The storage device estimates a fill level of the buffer at an elapsed time using the rate, the elapsed time, and the amount of data received from the host device over that elapsed time. If the estimated fill level of the buffer is above a threshold, the storage device increases a rate of receiving data from the host device.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

As mentioned above, a jitter buffer can be used in a host device to temporality hold streamed data until a storage device has the resources to accept and store the data. To ensure that the streamed data will not overflow the buffer, the buffer can be designed to be relatively large, and the channel between the host device and the storage device can be designed so that its rate is significantly faster than the rate that the host device sends the streamed data to the storage device. However, this is a relatively expensive solution, as, many times, the storage device has ample resources, and such a large jitter buffer is not necessary. The following embodiments provide a different approach to this problem that avoids this expense. Before turning to these and other embodiments, the following section provides a discussion of exemplary host and storage devices that can be used with these embodiments. Of course, these are just examples, and other suitable types of host and storage devices can be used.

Exemplary Host and Storage Devices

Figure 1:
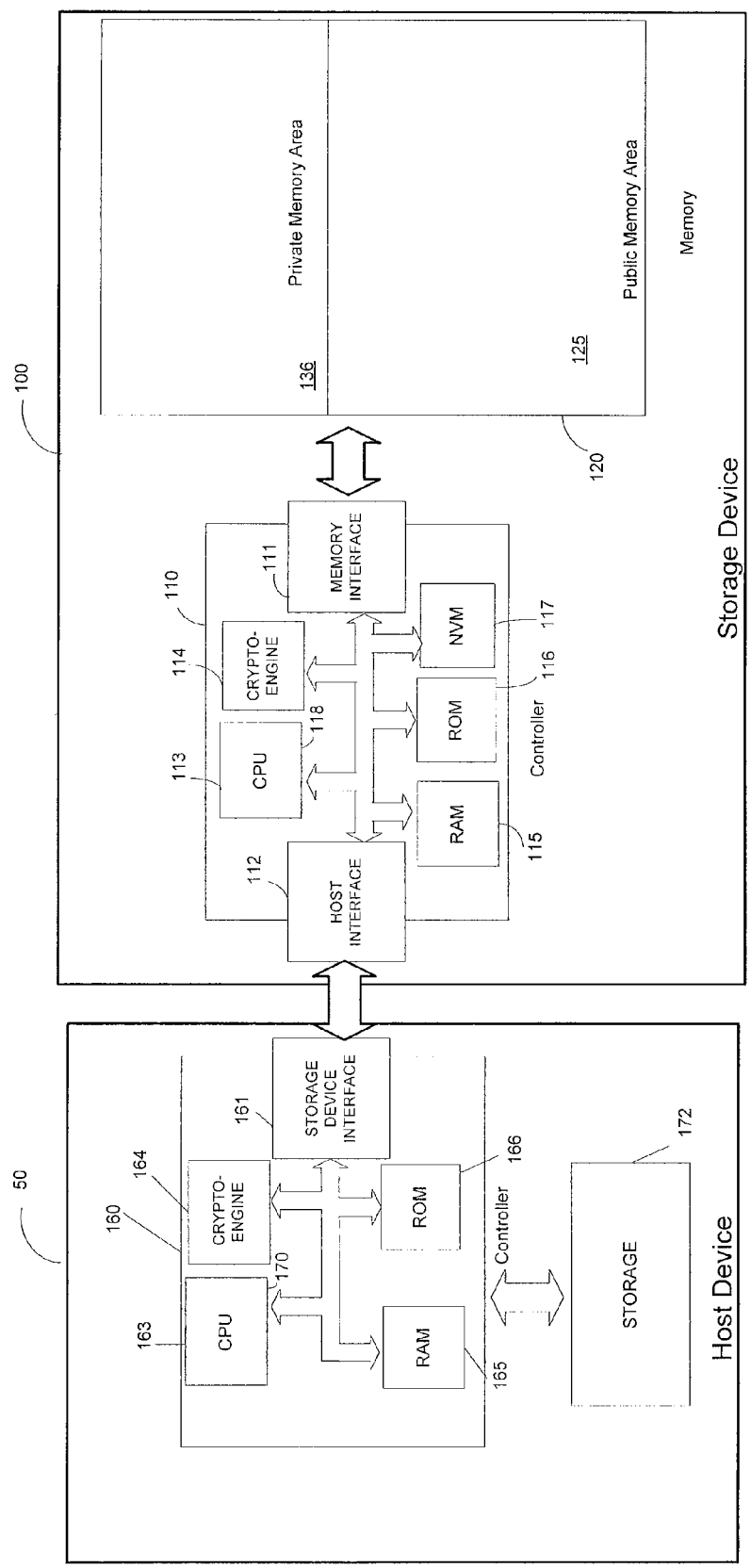
FIG. 1 is a block diagram of an exemplary host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. For example, the host device 50 and storage device 100 can each have mating physical connectors that allow the storage device 100 to be removably connected to the host device 50. The host device 50 can take any suitable form, such as, but not limited to, a mobile phone, a digital media player, a game device, a personal digital assistant (PDA), a personal computer (PC), a kiosk, a set-top box, a TV system, a book reader, or any combination thereof. The storage device 100 can take any suitable form, such as, but not limited to, a consumer, solid-state storage device, such as a Secure Digital (SD) memory card, a microSD memory card, a Compact Flash (CF) memory card, or a universal serial bus (USB) device. In one embodiment, the storage device 100 takes the form of an iNAND™ eSD/eMMC embedded flash drive by SanDisk Corporation.

As shown in FIG. 1, the storage device 100 comprises a controller 110 and a memory 120. The controller 110 comprises a memory interface 111 for interfacing with the memory 120 and a host interface 112 for interfacing with the host 50. The controller 110 also comprises a central processing unit (CPU) 113, an optional hardware crypto-engine 114 operative to provide encryption and/or decryption operations, read access memory (RAM) 115, read only memory (ROM) 116 which can store firmware for the basic operations of the storage device 100, and a non-volatile memory (NVM) 117 which can store a device-specific key used for encryption/decryption operations, when used. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from Marvell or SandForce. The controller 110 can be used to implement the methods shown in the flowcharts and described below.

The memory 120 can take any suitable form. In one embodiment, the memory 120 takes the form of a solid-state (e.g., flash) memory and can be one-time programmable, few-time programmable, or many-time programmable. The memory 120 can also use single-level cell (SLC), multiple-level cell (MLC), triple-level cell (TLC), or other memory technologies, now known or later developed.

The memory 120 can comprise a single partition or multiple partitions. In one particular embodiment, the memory 120 comprises a public memory area 125 that is managed by a file system on the host 50 and a private memory area 136 that is internally managed by the controller 110. The private memory area 136 can store data, such as but not limited to content encryption keys (CEKs) and firmware (FW) code. The public memory area 125 can store user data and other data. The public memory area 125 and the private memory area 136 can be different partitions of the same memory unit or can be different memory units. The private memory area 136 is "private" (or "hidden") because it is internally managed by the controller 110 (and not by the host's controller 160). Again, this is just one exemplary implementation, and other configurations of the memory 120 can be used.

Turning now to the host 50, the host 50 comprises a controller 160 that has a storage device interface 161 for interfacing with the storage device 100. The controller 160 also comprises a central processing unit (CPU) 163, an optional crypto-engine 164 operative to provide encryption and/or decryption operations, read access memory (RAM) 165, read only memory (ROM) 166, and storage 172. The storage device 100 and the host 50 communicate with each other via a storage device interface 161 and a host interface 112. The host 50 can contain other components (e.g., video and/or audio sensors, a network connector, a display device, a speaker, a headphone jack, a video output connection, etc.), which are not shown in FIG. 1 to simplify the drawings. Of course, in practice, the host device 50 and storage device 100 can have fewer or different components than the ones shown in the figure.

In some environments, the host device 50 is operable to render content stored in the storage device 100. As used herein, "content" can take any suitable form, including, but not limited to, a song, a movie, a game, an application ("app"), a game installer, etc. Depending on the type of content, "render" can mean playing (e.g., when the content is a song or movie), deciphering (e.g., when the content is a game installer), or whatever action is needed to "enjoy" the content. In some embodiments, the host device 50 contains the necessary software to render the content (e.g., a media player), whereas, in other embodiments, such software is provided to the host device 50 by the memory device 100 or another entity.

Figure 2:
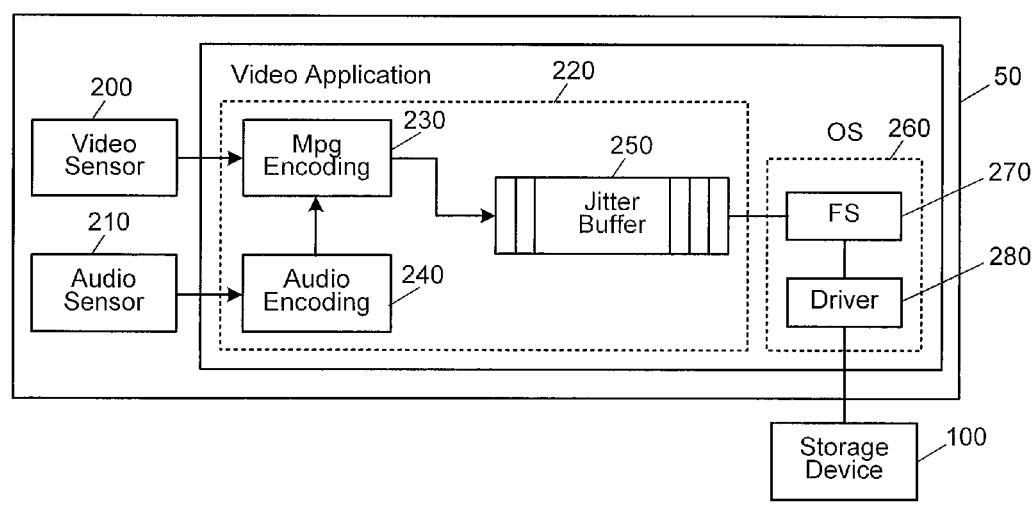
FIG. 2 is a block diagram of an exemplary host device with a video application and storage device of an embodiment.

Embodiments Related to Reallocating Storage Device Resources Based on an Estimated Fill Level of a Host Buffer Returning to the drawings, FIG. 2 is an illustration of how the host and storage devices 50, 100 can be used to reallocate storage device resources based on an estimated fill level of a host buffer. In the example shown in FIG. 2, the host device 50 contains video and audio sensors 200, 210 (e.g., a camera or CCD device and a microphone), which are connected to the host device's controller 160 to provide streamed data for storage in the storage device 100 (as will be discussed below, streamed data can also come from other sources). In this example, the controller 160 is implementing a video application 220 that includes Mpg and audio encoding modules 230, 240 (which can be implemented by the controller's CPU 163 running computer-readable program code (e.g., firmware stored in ROM 166)) and a jitter buffer 250 (which can be part of the controller's RAM 165 or part of other storage 172 in the host device 50). The controller 160 also implements (e.g., by computer-readable program code) an operating system 260, which contains a file system 270 and a storage device driver 280.

In operation, video signals are detected by the video sensor 200, and audio signals are detected by the audio sensor 210. When the video and audio sensors 200, 210 are active (i.e., when a user is shooting a film), the video and audio sensors 200, 210 typically generate raw data bits at a constant rate. These raw data bits are sent to the Mpg and audio encoding modules 230, 240 for processing to generate encoded data. The encoded data may vary in its rate since the rate may change as a function of the compressibility of the raw data bits. However, the variation is usually not very high. For the sake of simplicity and for illustrative purposes, this example will assume that the encoded data has a constant rate of 1 MB/sec. As such, the storage device 100 should be capable of meeting that rate and writing to its memory 120 at a rate that is slightly higher than 1 MB/sec. However, even if the storage device 100 is capable of meeting these rates at any given time, there are times when the storage device's resources may be diverted, resulting in lower rates. So, the controller 110 has to manage its resource budget while taking into account other tasks it has to perform in parallel with storing the encoded data stream from the Mpg encoder 230. As another example, the controller 110 may be responsible for storing multiple streams of data (as will be discussed in more detail below) and may need to plan its resource budget to meet the demands of all the associated data sources. As yet another example, the controller 110 may need to deal with and allocate resources for memory management processes, such as garbage collection. During garbage collection, the controller 110 may need to reduce or even temporarily stop write operations to the memory 120 from the host device 50 in order to find data stored in the memory 120 that will not be accessed in the future and reclaim the memory space used by that data. As yet another example, the controller 110 may have to deal with storing meta-data associated with the encoded data. The meta-data may originate from the host's file system 270 or from another source and can cause additional variation in the data rate experienced by the storage device 100.

To accommodate for variations in the instantaneous rate of writing to the storage device 100, a jitter buffer (or, more broadly, a buffer) 250 can be used to store the output of the Mpg encoder 230. (As noted above, the jitter buffer 250 in this embodiment can be part of the RAM 165, part of its storage unit 172, or some other part of the host device 50.) The jitter buffer 250 is used to account for the undesired deviation in storage rate of the storage device 100 (e.g., because of the factors discussed above) by storing the data until the storage device 100 is ready to store it. As mentioned above, one way to address these issues is to use a large jitter buffer and set the rate of the channel between the video application unit and the storage device 100 to be significantly faster than the rate at which encoded data is generated by the video application. However, this is an expensive solution. The following embodiments provide an alternative approach to achieve a desired minimal rate with limited memory resources (e.g., in the above example, at 1 MB per second and also at least 0.5 MB each half second) and will be illustrated in conjunction with FIG. 3, which is a flowchart of a method that can be implemented by the storage device's controller 110 (e.g., by executing computer-readable program code storing the algorithm). In general, this method can be used by the storage device 100 to estimate the jitter buffer fill level at a given time and to take the appropriate steps to reallocate storage device resources.

Figure 3:
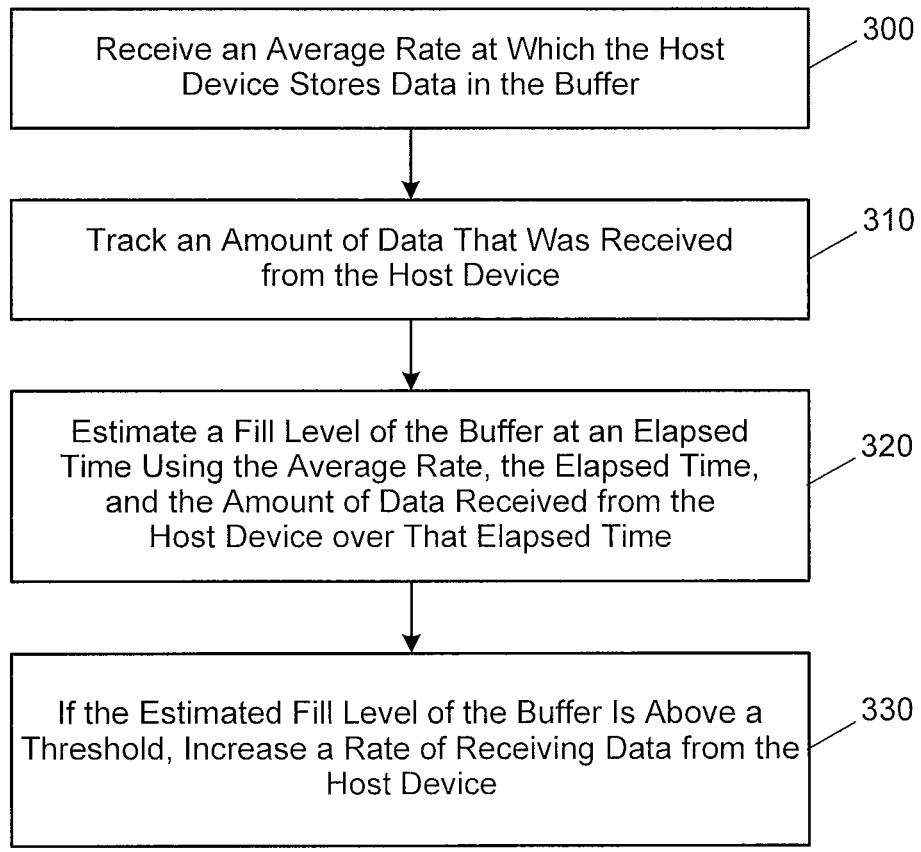
FIG. 3 is a flowchart of a method of an embodiment for reallocating storage device resources based on an estimated fill level of a host buffer.

As shown in FIG. 3, in this embodiment, the storage device 100 receives, from the host device 50, an average rate at which the host device 50 stores data in the buffer 250 (act 300). In the example shown in FIG. 2, this would be the average rate at which data enters the jitter buffer 250 from the Mpg encoding module 230, although rates other than the average rate can be used (e.g., the mean rate, an instantaneous rate, etc.). Next, the storage device 100 tracks an amount of data that was received from the host device 50 (act 310). The storage device 100 can keep a record of all the received data bits according to the sources of the data. In this way, separate records can be defined for the data whose source is the jitter buffer 250 and, for example, for metadata originating from the file system 270, as such data would not have an effect on the fill level of the jitter buffer 250 because it is not stored in the jitter buffer 250.

Then, the storage device 100 estimates a fill level of the buffer 250 at an elapsed time using the average rate, the elapsed time, and the amount of data received from the host device 50 over that elapsed time (act 320). For example, the following equation can be used to estimate the fill level of the jitter buffer 250 at an elapsed time::

$$J(\text{elapsedTime}) = \text{avgRate} \cdot \text{elapsedTime} - \text{receivedData},$$

which subtracts the total number of data bits received from the host device 50 from the product of the average rate and the elapsed time. This equation may be reset periodically or whenever the jitter buffer 250 is empty. (The storage device 100 can conclude that the jitter buffer 250 is empty when the video application 220 on the host device 50 denies requests for sending data.) This equation can also be reset whenever the estimation of J is negative. In mathematical language:

$$J = \max\{\text{avgRate} \cdot \text{elapsedTime} - \text{receivedData}, 0\}.$$

Preferably, whenever J is reset to 0, the elapsedTime parameter and the receivedData parameter are also reset to 0. Resetting J to 0 may preferably be done only when the jitter buffer 250 is indeed empty; otherwise, the load level of the jitter buffer 250 may accumulate while the estimation will remain low, and the jitter buffer 250 may eventually overflow without the storage device 100 being aware of it. In some embodiments, the values of elapsedTime and receivedData may be reset to 0, while the status of the estimate at that point is saved into an additional parameter. Later updates of the jitter buffer estimator can take this into account, and the update of J may take the form of:

$$J(\text{elapsedTime}) = \text{avgRate} \cdot \text{elapsedTime} - \text{receivedData} + \text{prev}J,$$

where elapsedTime and receivedData are computed from the last reset point and prevJ is the value of the jitter buffer estimator at the reset point.

If the estimated fill level of the buffer 250 is above a threshold, the storage device 100 increase a rate of receiving data from the host device 50 (act 330). The storage device 100 can increase the rate of receiving data from the host device 50 by reallocating storage device resources, such as available blocks of the memory. For example, the storage device 100 can reduce other tasks, such as garbage collection, and attend to the jitter buffer 250 by acquiring data from the host device 50 at a higher rate than the average application rate, thus improving the buffer status. In flash memory, blocks can be programmed by wordline or even by page but are only erased by blocks. This means that whenever data is updated (e.g., a given logical address (LBA) is overwritten by the host device 50), the updated data is programmed into a new wordline or new page, which probably resides in a different block than the original data. The mapping between the logical address and the physical address is updated, and the old physical address is invalidated. If this process continues, the flash memory will get stuck in no time since each new write command from the host device 50 requires a new physical location (wordline or page). Therefore, there is a need to free memory blocks that are fully or partially invalidated, and the process of freeing the blocks is called garbage collection. During this process, the valid data from blocks that are partially invalidated is copied to new blocks, and the old blocks are erased. For example, the valid data from two blocks, each of which contains invalidated data on half of the wordlines, may be copied into one new block for generating one new free block. The operation of garbage collection also requires free blocks, where the data from the blocks to be erased, is copied into these blocks. In a system designed for high jitter buffer performance, when the jitter buffer 250 level is estimated to be high, the storage device 100 can allocate more free blocks for writing data from the jitter buffer 250 and reduce or refrain from performing garbage collection. The number of blocks that will be assigned for garbage collection can be reduced, or, in some cases, all the free blocks may be allocated to the jitter buffer 250, and the process of garbage collection may be stopped until the level of the jitter buffer 250 gets lower or until the free blocks are exhausted, and there is a need to perform garbage collection. Refraining from performing garbage collection may increase the instantaneous rate of reading from the jitter buffer 250, since the system performs fewer read and write operations. Also, the added number of blocks allocated to reading the jitter buffer 250 allows for reading a larger amount of data from the jitter buffer 250.

Typically, in a system designed for jitter buffer performance, a predefined number of blocks will be allocated to jitter buffer performance. Whenever the number of free blocks in the system is higher than the predefined number, this number of free blocks will be allocated for jitter buffer performance and will not be used for garbage collection, such that if a burst of data occurs, the free blocks will be able to absorb the burst for some time. Another measure taken by a system designed for jitter buffer performance is to perform the garbage collection operations in small quantities and after a relatively small number of programming operations. The jitter buffer level may be estimated after each garbage collection operation, and if the buffer level becomes too high, garbage collection can be suspended for a predefined amount, and a burst of data can be read from the buffer. Thus, the jitter buffer 250 can be monitored regularly to avoid overflow, so there are always enough free blocks to absorb a burst. Systems which are not designed for a jitter buffer operation may choose to implement the garbage collection for a larger number of blocks and only after a larger number of write operations.

There are several advantages associated with this embodiment. For example, with these embodiments, the host device 50 can use a smaller jitter buffer 250 and a lower bandwidth channel than previously used in achieving a given system performance specification. Also, a host device with a given jitter buffer size and a given channel bandwidth can achieve better performance than prior systems. Further, these embodiments can be used to support a larger number of data streams using a given amount of storage device resources.

Figure 4:
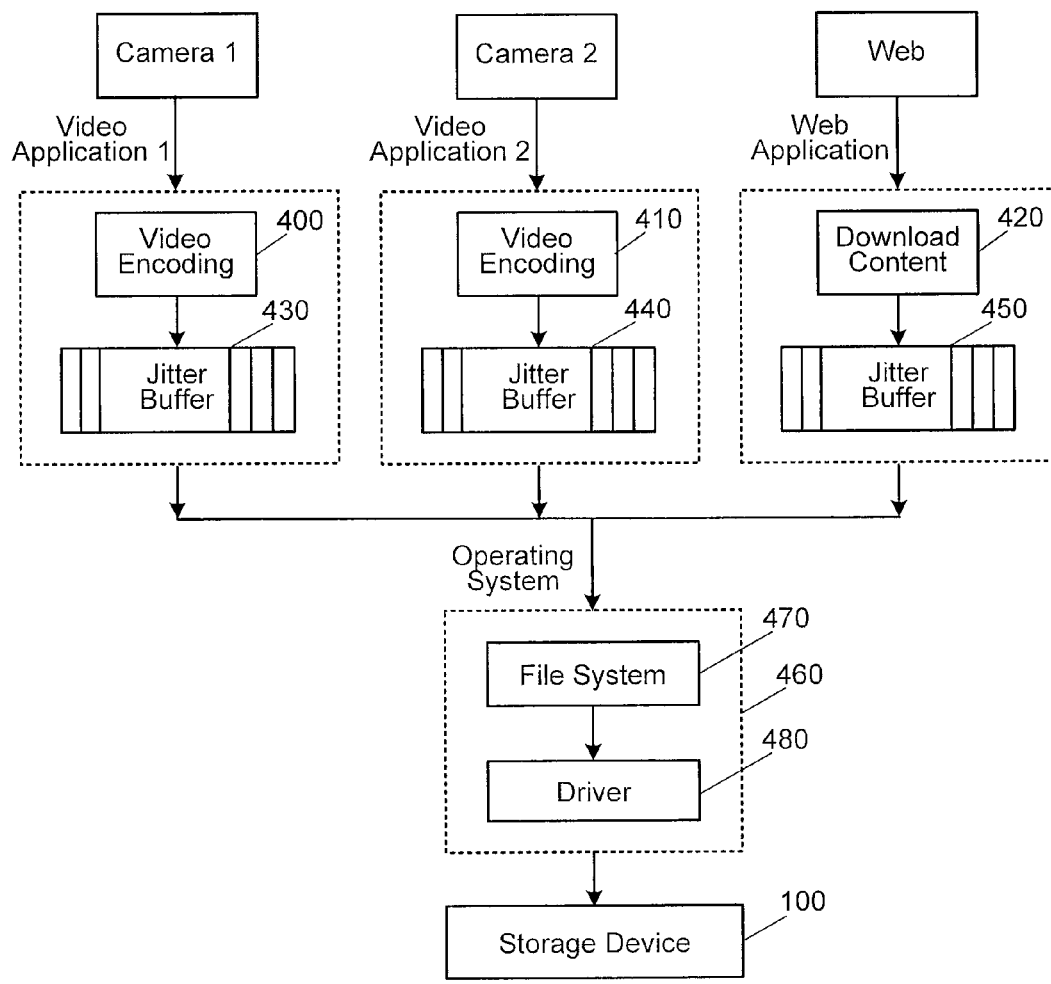
FIG. 4 is a block diagram of an embodiment with multiple streaming sources.

There are many alternatives that can be used, for example, in memory systems that allow overlapped commands (e.g., SATA), the storage device 100 can manage storage device resources by choosing to give a higher priority to commands associated with a given stream of data. In such systems, when a jitter buffer level associated with a certain stream is higher than a desired level, the storage device 100 can decide to give a high priority to write commands associated with the stream and a lower priority to other streams, thus reducing the jitter buffer level of a given stream. In memory systems that require in-order execution of commands, the storage device 100 can adjust the jitter buffer levels by allocating and de-allocating resources to garbage collection processes and, in parallel, can decrease or increase the resources allocated to the host device 50. The storage device 100 can also accept data from other sources. For example, FIG. 4 shows streams coming from two video applications and a web application, where the video applications have their own video encoding modules 400, 410 and jitter buffers 430, 440, and wherein the web application has downloaded content 430 and a jitter buffer 450. In this example, there is a single operating system 460 with a file system 470 and driver 480 that provides the three streams to the storage device 100. The controller 110 in the storage device 100 can be responsible for storing the multiple streams of data and may need to plan its resource budget to meet the demands of all the associated data sources.

As another alternative, one or more of the following strategies can be used with these embodiments. First, the storage device resources allocated to a specific application on the host device 50 may be a linear function of the estimated fill level of the jitter buffer of the application. Second, the storage device resources allocated to a specific application may be a monotonic non-linear function of the estimated fill level of the jitter buffer of the application, such that, at each point, enough resources are allocated to prevent the jitter buffer of the application from overflowing. Third, a hysteresis strategy can be used in which at least two thresholds are defined, such that whenever the estimation of a jitter buffer falls below a first threshold, resources are allocated to garbage collection; and whenever the estimation of the jitter buffer is above a second threshold, the resources are de-allocated from garbage collection for receiving data from the jitter buffer and reducing its load. Fourth, a rationing strategy can be used in which, after writing a certain (first pre-defined) amount of data, a certain amount of time and resources are allocated for garbage collection. The storage device 100 can then choose to perform garbage collection after each allocation of resources. Alternatively, the storage device 100 may accumulate a number of garbage collection resource allocations and perform garbage collection only after a certain amount of resources has been allocated. This strategy may allow the garbage collection to work in larger quantities of data, thus allowing for more efficient internal management of the garbage collection process.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage device comprising:
   a memory;
   an interface through which to communicate with a host device, wherein the host device has a buffer configured to store data before the data is sent to the storage device for storage in the memory; and
   a controller in communication with the memory and the interface, wherein the controller is configured to:
      receive, from the host device, a rate at which the host device stores data in the buffer;
      track an amount of data that was received from the buffer in the host device over time;
      estimate a fill level of the buffer at an elapsed time using the rate, the elapsed time, and the amount of data received from the host device over that elapsed time; and
      if the estimated fill level of the buffer is above a threshold, increase a rate of receiving data from the host device in order to avoid the buffer in the host device from overflowing.

2. The storage device of claim 1, wherein the controller is configured to increase the rate of receiving data to a rate higher than the rate at which the host device stores data in the buffer.

3. The storage device of claim 1, wherein the controller is configured to increase the rate of receiving data from the host device by reducing storage device resources allocated to a garbage collection operation.

4. The storage device of claim 1, wherein the controller is configured to increase the rate of receiving data from the host device by reducing a rate of receiving data from other sources.

5. The storage device of claim 1, wherein the controller is configured to increase the rate of receiving data from the host device by giving higher priority to commands in a packed command that are associated with data stored in the buffer.

6. The storage device of claim 1, wherein the controller is configured to increase the rate of receiving data by reallocating resources as a linear function of an estimated available capacity of the buffer.

7. The storage device of claim 1, wherein the controller is configured to increase the rate of receiving data by reallocating resources as a non-linear function of an estimated available capacity of the buffer in order to decrease the fill level below the threshold.

8. The storage device of claim 1, wherein the controller is configured to increase the rate of receiving data by reallocating resources according to a hysteresis function.

9. The storage device of claim 1, wherein the controller is configured to increase the rate of receiving data by reallocating resources according to a rationing strategy.

10. The storage device of claim 1, wherein the controller is further configured to reset the estimate of the fill level of the buffer.

11. The storage device of claim 10, wherein the estimate is reset periodically.

12. The storage device of claim 10, wherein the estimate is reset responsive to the controller concluding the buffer is empty.

13. The storage device of claim 12, wherein the controller concludes the buffer is empty responsive to the host device denying the storage device's request for additional data from the buffer.

14. The storage device of claim 12, wherein the controller concludes the buffer is empty response to the estimate being a negative value.

15. The storage device of claim 10, wherein the estimate of the fill level of the buffer is reset by setting the estimate, the elapsed time, and the tracked amount of data to zero.

16. The storage device of claim 10, wherein the estimate of the fill level of the buffer is reset by setting the elapsed time and the tracked amount of data to zero but retaining the estimate as an additional parameter for future estimates.

17. The storage device of claim 1, wherein: the host device is configured to send additional data to the storage device that was not stored in the buffer; and the controller is configured to exclude this additional data in the controller's estimation of the fill level of the buffer.

18. The storage device of claim 1, wherein: the host device is configured to send a plurality of streams of data to the storage device; each stream of data has its own respective buffer; and the controller is further configured to track an amount of data received from each stream.

19. The storage device of claim 1, wherein the controller is further configured to track an amount of data received from different sources in the host device.

20. A method for reallocating storage device resources based on an estimated fill level of a host buffer, the method comprising:
performing the following in a controller in a storage device in communication with a host device having a buffer for storing data before the data is sent to the storage device for storage in a memory of the storage device:
receiving, from the host device, a rate at which the host device stores data in the buffer;
tracking an amount of data that was received from the buffer in the host device over time;
estimating a fill level of the buffer at an elapsed time using the rate, the elapsed time, and the amount of data received from the host device over that elapsed time; and
if the estimated fill level of the buffer is above a threshold, increasing a rate of receiving data from the host device in order to avoid the buffer in the host device from overflowing.

21. The method of claim 20, wherein the controller increases the rate of receiving data to a rate higher than the rate at which the host device stores data in the buffer.

22. The method of claim 20, wherein the controller increases the rate of receiving data from the host device by reducing storage device resources allocated to a garbage collection operation.

23. The method of claim 20, wherein the controller increases the rate of receiving data from the host device by reducing a rate of receiving data from other sources.

24. The method of claim 20, wherein the controller increases the rate of receiving data from the host device by giving higher priority to commands in a packed command that are associated with data stored in the buffer.

25. The method of claim 20, wherein the controller increases the rate of receiving data by reallocating resources as a linear function of an estimated available capacity of the buffer.

26. The method of claim 20, wherein the controller increases the rate of receiving data by reallocating resources as a non-linear function of an estimated available capacity of the buffer in order to decrease the fill level below the threshold.

27. The method of claim 20, wherein the controller increases the rate of receiving data by reallocating resources according to a hysteresis function.

28. The method of claim 20, wherein the controller increases the rate of receiving data by reallocating resources according to a rationing strategy.

29. The method of claim 20 further comprising resetting the estimate of the fill level of the buffer.

30. The method of claim 29, wherein the estimate is reset periodically.

31. The method of claim 29, wherein the estimate is reset responsive to the controller concluding the buffer is empty.

32. The method of claim 31, wherein the controller concludes the buffer is empty responsive to the host device denying the storage device's request for additional data from the buffer.

33. The method of claim 31, wherein the controller concludes the buffer is empty response to the estimate being a negative value.

34. The method of claim 29, wherein the estimate of the fill level of the buffer is reset by setting the estimate, the elapsed time, and the tracked amount of data to zero.

35. The method of claim 29, wherein the estimate of the fill level of the buffer is reset by setting the elapsed time and the tracked amount of data to zero but retaining the estimate as an additional parameter for future estimates.

36. The method of claim 20, wherein the host device sends additional data to the storage device that was not stored in the buffer, and wherein the method further comprising excluding the this additional data in the estimation of the fill level of the buffer.

37. The method of claim 20, wherein the host device sends a plurality of streams of data to the storage device, wherein each stream of data has its own respective buffer, and wherein the method further comprises tracking an amount of data received from each stream.

38. The method of claim 20 further comprising tracking an amount of data received from different sources in the host device.

39. A storage device comprising:
a memory;
means for receiving, from a host device, a rate at which the host device stores data in a buffer in the host device before the data is sent to the memory in the storage device for storage;
means for tracking an amount of data that was received from the buffer in the host device over time;
means for estimating a fill level of the buffer at an elapsed time using the rate, the elapsed time, and the amount of data received from the host device over that elapsed time; and
means for increasing a rate of receiving data from the host device in order to avoid the buffer in the host device from overflowing, if the estimated fill level of the buffer is above a threshold.

* * * * *

UNITED STATES PATENT AND TRADEMARK OFFICE
CERTIFICATE OF CORRECTION

PATENT NO. : 9,703,527 B2
APPLICATION NO. : 13/735767
DATED : July 11, 2017
INVENTOR(S) : Amir Shaharabany et al.

Page 1 of 1

It is certified that error appears in the above-identified patent and that said Letters Patent is hereby corrected as shown below:

In the Claims

In Column 9, Claim 14, Line 2, after "the buffer is empty" insert --in--.

In Column 9, Claim 17, Line 11, after "claim 1, wherein:" start a new paragraph with the words "the host".

In Column 9, Claim 17, Line 13, after "the buffer; and" start a new paragraph with the words "the controller is".

In Column 9, Claim 18, Line 16, after "claim 1, wherein:" start a new paragraph with the words "the host".

In Column 9, Claim 18, Line 18, after "the storage device;" start a new paragraph with the words "each stream of data".

In Column 9, Claim 18, Line 19, after "buffer; and" start a new paragraph with the words "the controller is".

In Column 10, Claim 33, Line 23, after "the buffer is empty" insert --in--.

In Column 10, Claim 36, Line 35, before "data in the estimation of" replace "the this additional" with --the additional--.

Signed and Sealed this
Tenth Day of April, 2018

Andrei Iancu
*Director of the United States Patent and Trademark Office*